(12) United States Patent
Tischer

(10) Patent No.: US 8,156,426 B2
(45) Date of Patent: Apr. 10, 2012

(54) SYSTEM AND METHOD FOR RAPID CREATION AND DISPLAY OF STYLIZED DIGITAL CONTENT ITEMS

(75) Inventor: Steven Neil Tischer, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 269 days.

(21) Appl. No.: 12/472,348

(22) Filed: May 26, 2009

(65) Prior Publication Data

US 2009/0235160 A1    Sep. 17, 2009

Related U.S. Application Data

(63) Continuation of application No. 11/357,606, filed on Feb. 17, 2006, now Pat. No. 7,555,714, which is a continuation of application No. 09/896,166, filed on Jun. 29, 2001, now Pat. No. 7,028,257.

(51) Int. Cl.
*G06F 17/00* (2006.01)

(52) U.S. Cl. ......... 715/248; 715/235; 715/243; 715/249

(58) Field of Classification Search .............. 200/234, 200/236, 240, 241, 200
See application file for complete search history.

(56) References Cited

U.S. PATENT DOCUMENTS

| | | | |
|---|---|---|---|
| 6,094,186 A * | 7/2000 | Kuroda et al. | 715/246 |
| 6,320,602 B1 | 11/2001 | Burkardt et al. | |
| 6,327,628 B1 * | 12/2001 | Anuff et al. | 719/311 |
| 6,336,124 B1 * | 1/2002 | Alam et al. | 715/205 |
| 6,339,446 B1 | 1/2002 | Miyoshi | |
| 6,477,549 B1 * | 11/2002 | Hishida et al. | 715/201 |
| 2002/0041287 A1 * | 4/2002 | Engeldrum et al. | 345/589 |
| 2002/0051080 A1 * | 5/2002 | Tanaka | 348/552 |
| 2002/0080168 A1 * | 6/2002 | Hilliard et al. | 345/744 |
| 2002/0091738 A1 * | 7/2002 | Rohrabaugh et al. | 707/517 |
| 2002/0135621 A1 * | 9/2002 | Angiulo et al. | 345/838 |
| 2002/0161803 A1 * | 10/2002 | Shelton | 707/528 |
| 2002/0165881 A1 * | 11/2002 | Shelton | 707/526 |
| 2002/0194227 A1 | 12/2002 | Day et al. | |
| 2003/0014447 A1 | 1/2003 | White | |
| 2003/0204814 A1 | 10/2003 | Elo et al. | |

OTHER PUBLICATIONS

Boguraev et al. "Dynamic Document Presentation" SIGCHI, pp. 1-10 (Apr. 1998).
Bosch et al. "New Visualization Techniques", SIGGRAPH, pp. 1-15 (Feb. 2000).
Beale, S. "Inexpensive photo retouching for novices" Kai's Photo Soap, Macworld (2001), pp. 1-3.
Kai's More Powerful Graphics Tools MetaCreations Kai's Power Tools 5, PC World Magazine (Mar. 1999), pp. 1-2.

* cited by examiner

*Primary Examiner* — Stephen Hong
*Assistant Examiner* — Gregory J Vaughn
(74) *Attorney, Agent, or Firm* — Parks IP Law LLC; Jennifer P. Medlin, Esq.

(57) ABSTRACT

Stylized digital content is rapidly created by reading a first file and a plurality of second files. The first file contains a digital content item and each second file contains at least one style definition. At least one display instance of stylized digital content is created by applying the style definition of one of the plurality of second files to the digital content item of the first file. The at least one display instance is mapped to a location on the display device. A location is received from a pointing device and one of the plurality of display instances is displayed based on the received location.

9 Claims, 6 Drawing Sheets

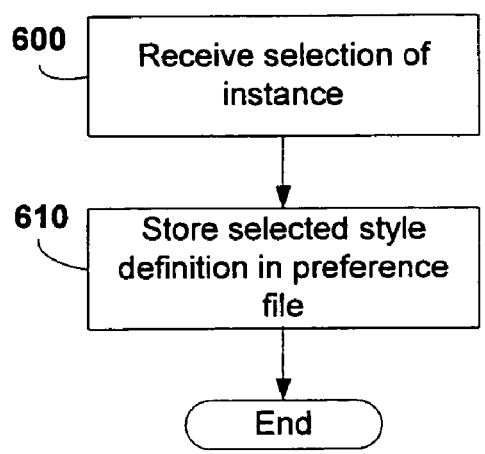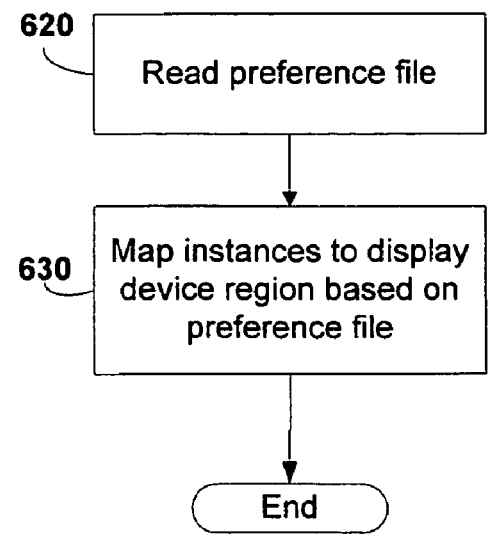
Figure 6a
Figure 6b

SYSTEM AND METHOD FOR RAPID CREATION AND DISPLAY OF STYLIZED DIGITAL CONTENT ITEMS

RELATED CASES

The present application is a continuation of U.S. patent application Ser. No. 11/357,606 filed on Feb. 17, 2006 now U.S. Pat. No. 7,555,714. U.S. patent application Ser. No. 11/357,606, in turn, is a continuation of U.S. patent application Ser. No. 09/896,166 filed on Jun. 29, 2001 (now issued as U.S. Pat. No. 7,028,257). The disclosures of the aforementioned applications are hereby incorporated herein, in their entirety, by reference.

FIELD OF THE INVENTION

The present invention generally relates to the field of computer software. More particularly, the present invention relates to computer software for rapid creation and display of stylized digital content items.

BACKGROUND OF THE INVENTION

Today, stylized digital content is often developed with software. Stylized digital content includes digital content items, such as, for example, files, text, graphics, etc., which has a style applied to it. For example, the digital content item may be a business name and the style may be a font for displaying the business name. Despite improvements in software, the development of stylized digital content is still a very time consuming process. For example, to develop a printed or computer generated advertisement, the developer of the advertisement may need to navigate through a series of complex screens and drop-down menus to create the advertisement. Once the advertisement is created, the developer may desire to modify the advertisement to determine if a modified advertisement is more appealing. Creating each modified advertisement may take several mouse clicks to develop. Also, to modify the advertisement, the developer may need to navigate through the same series of screens and drop-down menus. This process is repeated until the advertisement is acceptable to the developer. The more modifications that are desired, the more time it takes to develop and view the modified advertisement.

Particularly in advertising, where attractiveness is paramount, arriving at the desired combination, sizing, coloring, and arrangement of elements can be a complex and time consuming task, which is often left to professional developers. However, with the proliferation of the Internet and self publishing tools, there are an increasing number of "non-professionals" developing stylized digital content. There are many situations when "non-professionals" desire to quickly create attractive stylized digital content. For example, a sales person may desire to quickly create an advertisement while travelling to a sales meeting. Non-professionals may take much longer to develop a desirable advertisement using conventional tools. A professional typically develops a feel for which arrangements, colors, etc. work well. However, non-professionals usually do not have this experience and may have to spend a great deal of time developing a multitude of advertisements before selecting a desirable one. Further, even professional developers may desire a quicker way of arriving at a desirable end product.

In view of the foregoing, there is a need for a system and method for rapid creation and display of stylized digital content.

SUMMARY OF THE PRESENT INVENTION

The present invention is directed to the rapid creation and display of stylized digital content items using a pointing device. Instances of stylized digital content items are generated and mapped to locations on a display. For each location on the display received from the pointing device, an instance of stylized digital content items corresponding to the received location is displayed. In this way, a user may move the pointing device to quickly preview or audition various instances of stylized digital content.

According to one aspect of the present invention, stylized digital content is rapidly created and displayed by reading a content file and a plurality of style files. The content file contains a digital content item, such as a text string of a business name. Each style file contains at least one style definition, such as a font size, a font style, and the like. Display instances of stylized digital content are created by applying the style definition(s) of each style file to the digital content items of the content file. For example, one display instance may be created by applying a first style file to the content file, resulting in a business name being displayed in 12 point Times Roman font. A second display instance may be created by applying a second style file to the content file, resulting in a business name being displayed in 18 point Courier font. The style files may be applied to the content file according to several known techniques, such as applying an extensible style language file to an extensible markup language file.

Display instances are created and mapped to a location on the display device. A location on the display is designated by the user using the pointing device and a display instance corresponding to the designated location is displayed. Thereafter, locations are continually received and a display instance corresponding to the received location is displayed. In this manner, a user may quickly scroll through many display instances of stylized digital content items simply by moving a pointing device. Once a desirable display instance is viewed, it may be selected. Selection may be achieved by releasing a finger from a touch screen, clicking the mouse, or the like.

According to another aspect of the present invention, a particular style definition may be accepted. Once the particular style definition is accepted, a subset of files is selected from the plurality of style files based on the accepted style definition. For example, a user may accept an italic font for a business name, and vary the style definitions applied to the remaining digital content items. A plurality of display instances of stylized digital content is created by applying the style definition of each file of the subset of files to the content of the content file. Each of the subset of files includes the accepted style definition. Because all of the displayed instances include the accepted style definition, a user does not have to waste time previewing or auditioning known undesirable display instances.

The above-listed features, as well as other features, of the present invention will be more fully set forth hereinafter.

BRIEF DESCRIPTION OF THE DRAWINGS

The present invention is further described in the detailed description that follows, by reference to the noted plurality of drawings by way of non-limiting illustrative embodiments of the present invention, in which like reference numerals represent similar parts throughout the several views of the drawings, and wherein:

FIGS. 6a and 6b are flow diagrams of a method for storing a user preference and displaying stylized digital content based on the stored user preference, in accordance with an embodiment of the present invention.

DETAILED DESCRIPTION OF THE ILLUSTRATIVE EMBODIMENTS

The present invention is directed to the rapid creation and display of stylized digital content items using a pointing device. Instances of stylized digital content items are generated and mapped to locations on a display. For each location on the display received from the pointing device, an instance of stylized digital content items corresponding to the received location is displayed. In this way, a user may move the pointing device to quickly preview or audition various instances of stylized digital content.

Figure 1:
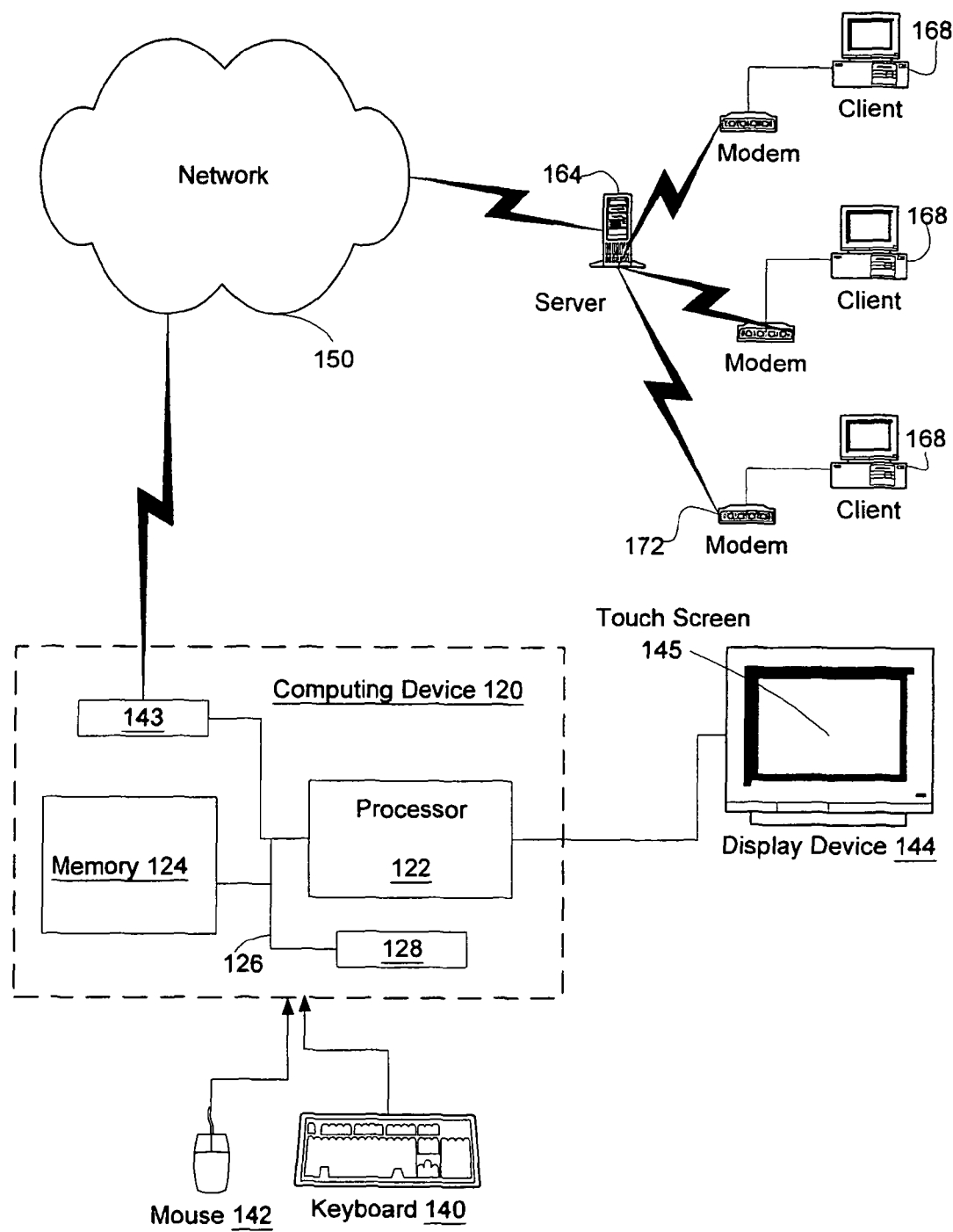
FIG. 1 is a block diagram of an exemplary computing device and communications network with which the present invention may be employed.

FIG. 1 is a block diagram of a generic computing system with which the present invention may be employed. As shown in FIG. 1, computing device 120 includes processor 122, system memory 124, and system bus 126 that couples various system components including system memory 124 to processor 122. System memory 124 may include read-only memory (ROM) and/or random access memory (RAM). Computing device 120 may further include hard-drive 128, which provides storage for computer readable instructions, data structures, program modules, data, and the like. A user (not shown) may enter commands and information into the computing device 120 through input devices such as a keyboard 140 and/or a mouse 142. A display device 144, such as a monitor, a flat panel display, or the like is also connected to the computing device 120 for output. Display device 144 includes touch screen 145. Display device 144 may also include other pointing devices such as a light pen, a grid of light beams, or the like for inputting information into processor 122. Communications device 143, which in one embodiment is a modem, provides for communications over network 150. Processor 122 can be programmed with instructions to interact with other computing systems so as to perform the techniques described below. The instructions may be received from network 150 or stored in memory 124 and/or hard drive 128. Processor 122 may be loaded with any one of several computer operating systems such as WINDOWS NT operating system, WINDOWS 2000 operating system, LINUX operating system, and the like.

As shown in FIG. 1, computing device 120 may be connected to computer network 150. Server 164 is operable to communicate with other computing devices over network 150. Network 150 may be the Internet, a local area network, a wide area network, or the like. Server 164 may communicate e-mails, web pages, and other data. Server 164 may be operated by an ISP, a corporate computer department, or any other organization or person with a server connected to network 150. Server 164 is accessible by client stations 168 from which users may send and receive data and browse web pages. Client stations 168 may connect to servers via a local area network (not shown) or using a remote connection device 172 such as, for example, a modem, as is shown in connection with server 164.

Figure 3:
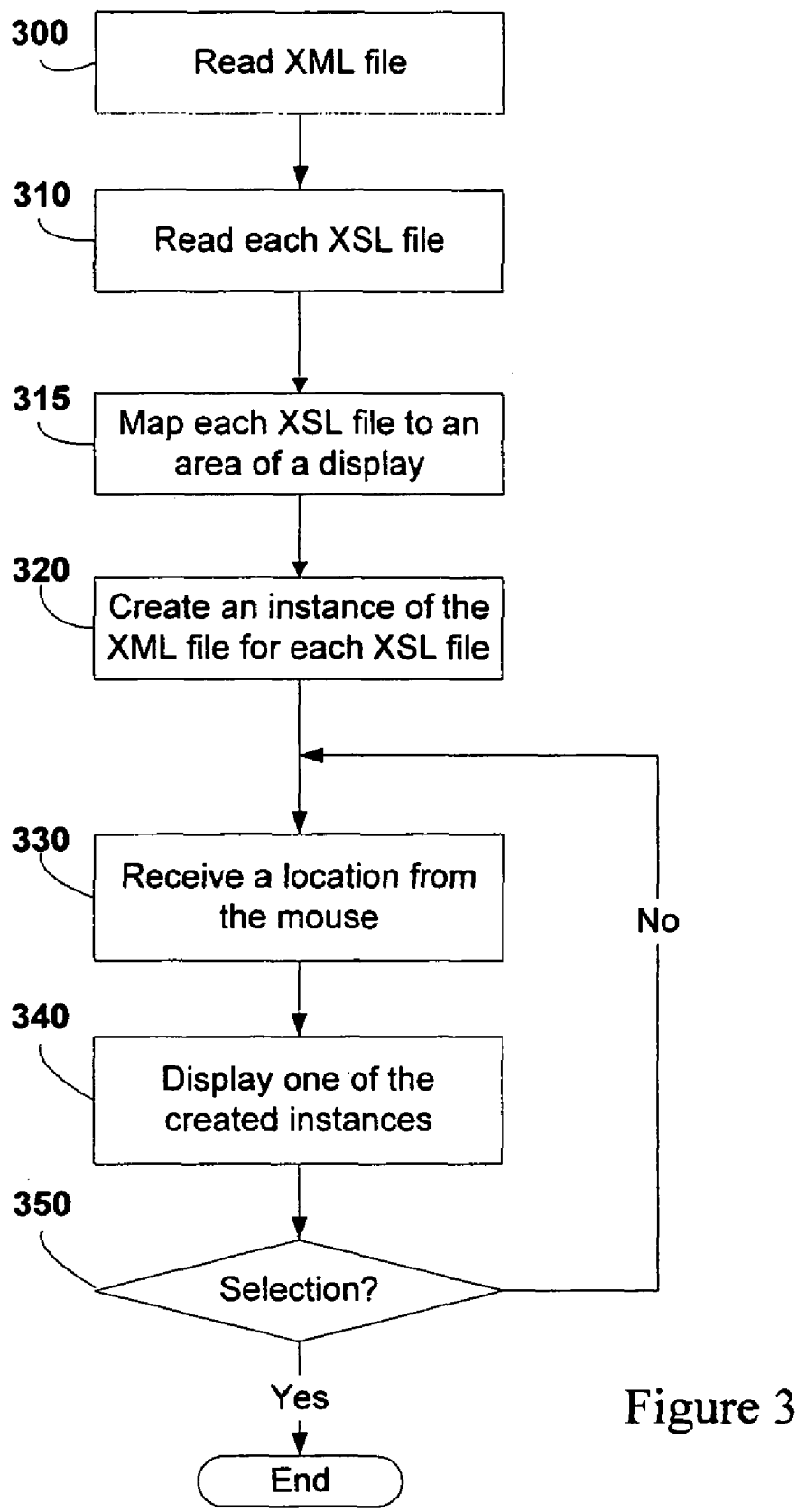
FIG. 3 is a flow diagram of a method for rapidly creating stylized digital content items, in accordance with an embodiment of the present invention.

FIG. 3 is a flow diagram of a method in accordance with one embodiment of the present invention, as applied to the computing device of FIG. 1. As shown in FIG. 3, at step 300, processor 122 reads a content file. The term "content file" is defined herein as a file containing a digital content item or a reference to a digital content item. Digital content items may include a text string, a text file, a graphical image file, an audio file, and the like. A content file may be used to group several digital content items. To explain further, if the digital content item is a text string of "123-456-7890," the content file may simply contain the text string "123-456-7890." If the digital content item is a graphical image file, for example, a jpg file, the content file may contain the location of the file, for example, "c:/phonenumbers/1234567890.jpg." In either event, the content file allows an application to access the digital content item, either directly or indirectly.

In this illustration, the content file is an extensible markup language (XML) file; however, it is contemplated that the content file may be any file containing digital content items. For example, at step 300, processor 122 reads the following XML file:

```
<XMLFILE>
<NAME> Cousin Lou's </NAME>
<BUSTYPE> Italian Restaurant </BUSTYPE>
<PHONE> 123-456-7890 </PHONE>
</XMLFILE>
```

The above XML file has a tag of 'NAME' with an associated content of 'Cousin Lou's', a tag of 'BUSTYPE' with an associated content of 'Italian Restaurant', and a tag of 'PHONE' with an associated content of '123-456-7890'. Processor 122 may read the content file from memory 124, hard drive 128, network 150, or the like.

At step 310, processor 122 reads style files. A style file is defined herein as a file containing a style definition which affects the appearance of the content item when displayed on a display device. Style definitions may include information specifying a font, a font size, a font style, a color, a justification, a display instance size, and the like. A display instance is defined herein as digital information in a format which may be sent to a display device for displaying. The display instance may contain, for example, plain text and/or a graphical bitmap.

In the present illustration, the style file is an extensible style language XSL files; however, it is contemplated that the style file may be any file containing style definitions that may be applied to a digital content item, such as a cascading style sheet, or the like. The XSL files contain tags and one or more style definitions corresponding to each tag. The tags are used to map style definitions to particular digital content items in the content file. For example, a first XSL file contains the tag 'NAME' having corresponding style definitions of 12 point font size and regular font style, the tag 'BUSTYPE' having corresponding style definitions of 12 point font size and regular font style, the tag 'PHONE' having corresponding style definitions of 12 point font size and regular font style. A second XSL file contains the tag 'NAME' having corresponding style definitions of 14 point font and regular font style, and the tag 'BUSTYPE' having corresponding style definitions of 12 point font and regular font style, the tag 'PHONE' having corresponding style definitions of 12 point font size and regular font style. A third XSL file contains the tag 'NAME' having corresponding style definitions of 14 point font and regular font style, the tag 'BUSTYPE' having corresponding style definitions of 12 point font and italic font style, the tag 'PHONE' having corresponding style definitions of 12 point font size and regular font style. A fourth XSL file contains the tag 'NAME' having corresponding style definitions of 14 point font and regular font style, and the tag 'BUSTYPE' having corresponding style definitions of 12 point font and italic font style, the tag 'PHONE' having corresponding style definitions of 12 point font size and italic font style. Thus, each style file defines a set of style definitions which may be applied to the digital content items.

In order for style files to be applied to the content file, style files are either predetermined or created from a predefined criteria. Style files may be predetermined to include a style file for each of the most common combination of style definitions. Alternatively, the style files may include a style file for every possible combination of style definitions or some subset of every possible combination of style definitions. Style files might also be created based on a predefined criteria. The predefined criteria may include selected style definitions and processor 122 may create a style file for every combination of the selected style definitions. Style files may be stored on hard drive 128, memory 124, or the like.

At step 315, processor 122 maps each style file to an area of display device 144. Processor 122 determines the number of style files and divides the area of the display device into at least as many areas as the number of style files. In this illustration, since there are four style files, processor 122 divides the display device 144 into four areas by dividing the maximum number of x-pixels on display device 144 by two and the maximum number of y-pixels by two. For example, for a 800-x-pixel by 600-y-pixel display, the 800-x-pixels are divided by two, resulting in a threshold value of four hundred and the 600-y-pixels are divided by two, resulting in a threshold value of three hundred. These threshold values result in the display device 144 being divided into areas, or quadrants in the case of four style files. Each of the style files is associated with or mapped to one of the areas.

Alternatively, if the number of style files is very large, the style files may be mapped to a pixel location rather than an area of the display device. To implement this mapping, a single number can be derived from the x-pointer and y-pointer location according to x-pixel-location+(y-pixel-location*maximum-x-pixels) and each derived number may then be mapped to a style file.

The methodology for mapping of the style files to a particular area may be based upon any number of criteria including a predefined order of style files, an alphabetical ordering of the style files, or the like. Preferably, the style files are mapped to locations on the display whereby similar styles are in close proximity to one another on the display device. For example, style files resulting in text being displayed in italics should be mapped to locations on the display that are in close proximity to one another. By mapping similar style files in close proximity to one another, user of the system can quickly locate display instances that are appealing and concentrate on auditioning variations thereof.

At step 320, processor 122 creates a display instance of the content file for each style file read at step 310. As described in more detail below, only one display instance is displayed on display device 144 at a time; however, processor 122 may create the display instances at various times.

In the present embodiment, processor 122 creates a display instance using each style file in advance of proceeding to the next step. In this manner, processor 122 is efficiently utilized and the user may quickly view many different display instances. That is, while the user is proceeding to the next step, processor 122 is already creating the display instances that will be used in the next step. Therefore, once the user begins using the pointing device to view display instances, the display instances need only be sent to the display; rather than being created and then being sent to the display.

Alternatively, processor 122 may begin creating display instances and proceed to step 330 while concurrently completing the creation of the remaining instances. If this technique is employed, the user will not be delayed from proceeding to the next step; however, some display instances may be slower to appear on the display device. This technique may be preferred in some cases due to computing limitations of computing device 120 or other design concerns. For example, this technique may be preferred if style files and content files are being read from network 150. According to another technique for creating display instances, the display instances are created beforehand by processor 122 or another processor, for example, accessible over network 150.

Figure 2:
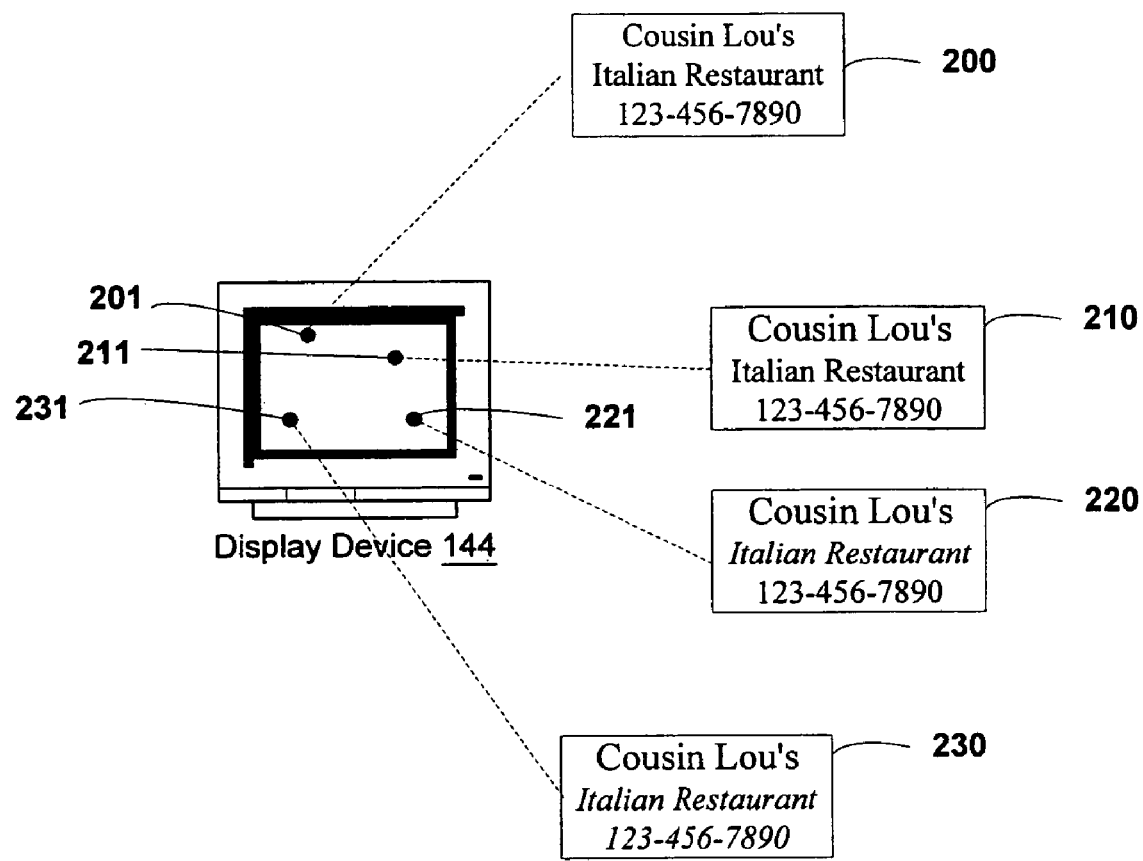
FIG. 2 is an illustration of the operation of an embodiment of the present invention.

FIG. 2 provides an illustrative example of display instances that may be created and displayed. For example, applying the first XSL file to the first XML file creates display instance 200. As shown in FIG. 2, display instance 200 includes the content of the XML file having the style definitions of the first XSL file applied to the content. In display instance 200, 'Cousin Lou's' is displayed in 12 point font size and regular font style, 'Italian Restaurant' is displayed in 12 point font size and regular font style, and '123-456-7890' is displayed in 12 point font size and regular font style. Display instance 210 includes the content of the XML file having the style definitions of the second XSL file applied to the content. In display instance 210, 'Cousin Lou's' is displayed in 14 point font size and regular font style, 'Italian Restaurant' is displayed in 12 point font size and regular font style, and '123-456-7890' is displayed in 12 point font size and regular font style. Similarly, display instance 220 includes the content of the XML file having the style definitions of the third XSL file applied to the content. In display instance 220, 'Cousin Lou's' is displayed in 14 point font size and regular font style, 'Italian Restaurant' is displayed in 12 point font size and italic font style, and '123-456-7890' is displayed in 12 point font size and regular font style. Finally, display instance 230 includes the content of the XML file having the style definitions of the fourth XSL file applied to the content. In display instance 230, 'Cousin Lou's' is displayed in 14 point font size and regular font style, 'Italian Restaurant' is displayed in 12 point font size and italic font style, and '123-456-7890' is displayed in 12 point font size and italic font style.

Referring back to FIG. 3, at step 330, processor 122 receives an x-coordinate and a y-coordinate corresponding to a pointer location from mouse 142. In the present embodiment, mouse 142 is used to receive a pointer location, however, processor 122 may also receive a pointer location from a touch screen, light pen, or other pointing device.

At step 340, processor 122 identifies the style file that has been mapped to the received location and displays the instance corresponding to that style file. For example, as shown in FIG. 2, at a first pointer location 201 corresponding to a first quadrant, processor 122 displays instance 200. At a second pointer location 211 corresponding to a second quadrant, processor 122 displays instance 210. At a third pointer location 221 corresponding to a third quadrant, processor 122 displays instance 220. At a fourth pointer location 231 corresponding to a fourth quadrant, processor 122 displays instance 230.

Referring again to FIG. 3, at step 350, processor 122 determines if a selection is received from the mouse identifying that one of the display instances has been selected. The selection may be a mouse click, a release from a touch screen, a click of a light pen, or the like. If a selection is received, the currently displayed instance is the selected display instance and the processing ends. If a selection is not received, processor 122 returns to step 330 to receive another pointer location and to display another instance. Processor 122 continually places an instance on display device 144 until a display instance is selected. Once the display instance is selected, processor 122 marks the display instance as selected and may perform further processing, as described in more detail below.

Figure 4:
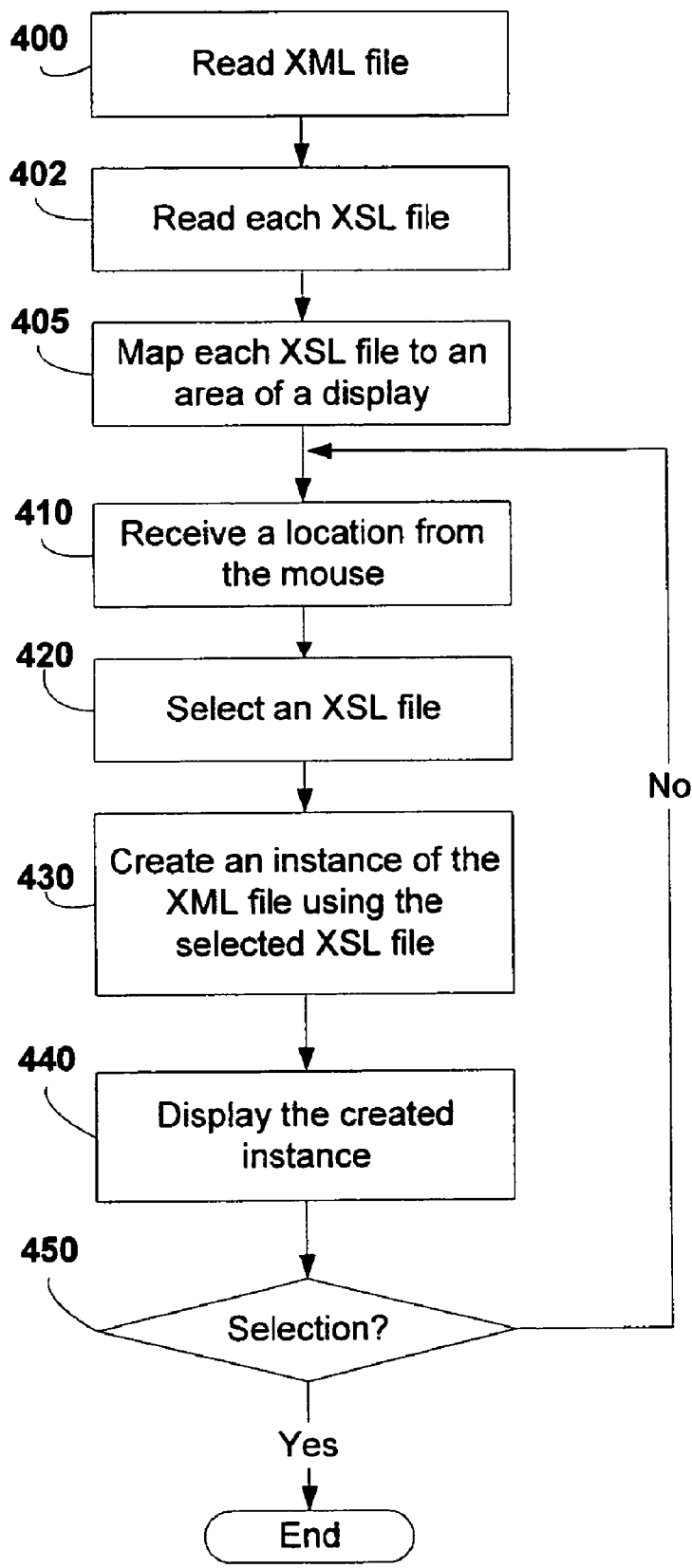
FIG. 4 is a flow diagram of another method for rapidly creating stylized digital content items one at a time, in accordance with an embodiment of the present invention.

Due to computing limitations of computing device 120 or other design concerns, it may be desirable for processor 122 to create only one display instance at a time in response to a received pointer location, rather than all at once as described in connection with FIG. 2. FIG. 4 is a flow diagram of a method for rapidly creating stylized digital content items, wherein display instances are created one at a time.

As shown in FIG. 4, at step 400, processor 122 reads a content file, using a procedure similar to that described above in connection with step 300. At step 402, processor 122 reads each style file, using a procedure similar to that described above in connection with step 310. At step 405, processor 122 maps each style file to an area of display device 144, using a procedure similar to that described above in connection with step 315. At step 410, processor 122 receives an x-coordinate and a y-coordinate corresponding to a pointer location from a pointing device. At step 420, processor 122 selects a style file based on the received pointer location and the mapping of step 405. At step 430, processor 122 creates a display instance of stylized digital content by applying the style file selected at step 420 to the content file read at step 400.

At step 440, the created instance is displayed on display device 144. It should be noted that processor 122 does not create every possible display instance in advance of receiving locations from the pointing device. Accordingly, display instances may be slower to appear on display device 144; however, this embodiment may be preferred in some cases due to computing limitations of computing device 120 or other design concerns. For example, this embodiment may be preferred if the style files are being read from network 150.

At step 450, processor 122 determines if a selection is received from the mouse. If a selection is received, the currently displayed instance is the selected instance and the processing ends. If a selection is not received, processor 122 returns to step 410 to receive another pointer location and to display another instance. Once the display instance is selected, processor marks the display instance as selected and may perform further processing.

Figure 5:
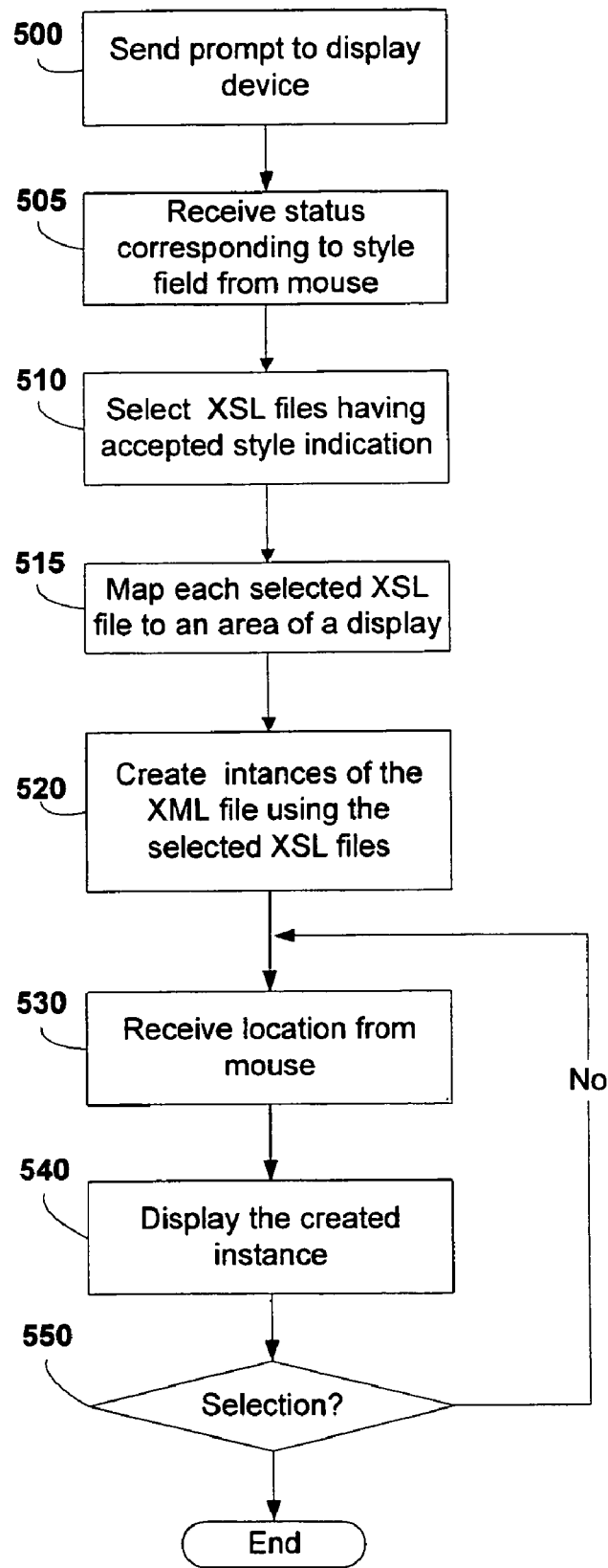
FIG. 5 is a flow diagram of a method for accepting a style definition and rapidly creating stylized digital content items based on the accepted style definition, in accordance with an embodiment of the present invention.

Rather than creating and displaying all combinations of style definitions, it may be advantageous to accept certain style definition, as applied to a digital content item of a content file, and vary the style definitions applied to the remaining digital content items of the content file. For example, a developer may desire a 14 point font size and regular font style for the business name but desire to vary the style definitions applied to the phone number and business type. In this case, it would be advantageous if the developer could accept the style definition where 14 point font size and regular font style is applied to the business name and vary the style applied to the remaining digital content items. FIG. 5 is a flow diagram of a method for accepting a style definition and varying other aspects of the style. It is envisioned that the process of FIG. 5 could be entered after a display instance has been selected as described in connection with FIG. 3 or FIG. 4.

At step 500, processor 122 sends a prompt including the style definitions of the selected display instance to display device 144. For example, if the user has selected display instance 220 (FIG. 2), processor 122 sends a dialog box including the following:

NAME
   Font size=14 point
   Font style=regular
BUSTYPE
   Font size=12 point
   Font style=italic
PHONE
   Font size=12 point
   Font style=regular The dialog box also includes a check box corresponding to each style definition. In this embodiment, all check boxes are marked as checked and sent to the display device; however, the check boxes may be sent as non-checked. A checked box indicates that the corresponding style definition has an accepted status and a non-checked box indicates that the corresponding style definition has a non-accepted status.

The user may check and un-check boxes with mouse 142 to revise the status of style definitions. In this manner, the user may accept some style definitions and keep other style definitions non-accepted. Accepted style definitions are included in every display instance created thereafter. Non-accepted style definitions are varied and available for previewing on display device 144 thereafter. For example, the user may accept the NAME and BUSTYPE font size and font style but leave the PHONE font size and font style non-accepted. Accordingly, during the next preview of display instances, the NAME and BUSTYPE font size and font style are not varied, but the PHONE font size and font style are varied in the display instances, as described in more detail below.

At step 505, processor 122 receives an accepted status or a non-accepted status corresponding to each style definition of each tag from mouse 142. The status may be stored in memory 124, in hard drive 128, or the like.

At step 510, processor 122 selects style files having the accepted style definition. In the context of this example, processor 122 selects the third and fourth XSL files because the third and fourth XSL files both have a 14 point font size and regular font style corresponding to tag 'NAME' and a 12 point font size and italic font style corresponding to tag 'BUSTYPE', which correspond to the accepted style definitions received at step 505.

At step 515, processor 122 maps each selected style file to an area of display device 144. Since there are two selected XSL files in the present illustration, processor 122 divides the display device 144 into two areas by dividing the maximum number of x-pixels on display device 144 by two to obtain a threshold value, as described above in step 340. The threshold value divides display device 144 into two areas. In this manner, processor 122 can map from a pointer location to a selected XSL file based on the threshold values.

At step 520, processor 122 creates a display instance of the content file for each style file selected at step 510. For example, applying the third XSL file to the XML file, display instance 220 (FIG. 2) is created and applying the fourth XSL file to the XML file, display instance 230 (FIG. 2) is created.

At step 530, processor 122 receives an x-coordinate and a y-coordinate corresponding to a pointer location from mouse 142. At step 540, processor 122 displays an instance based on the received pointer location and the mapping of step 515.

At step 550, processor 122 determines if a selection is received from the mouse. If a selection is received, then the currently displayed instance is the selected instance and the processing ends. If a selection is not received, then processor 122 returns to step 530 to receive another pointer location and to display another instance. Once the instance is selected, processor marks the instance as selected and may return to step 500 or may save the selected instance. The selected display instance may be saved as a XML file and an XSL file or the selected display instance may be save in some other file format such as jpg, bin, and the like. In this manner, a user may narrow the possible combinations of style definitions by accepting some style definitions and allowing the others to be varied.

In addition to narrowing the possible combinations of style definition, a developer's preferences may be stored and used in displaying instances. FIG. 6a is a flow diagram of a method for storing a user preference of stylized digital content. As shown in FIG. 6a at step 600, processor receives a selection of a display instance, for example, as described in step 550 above. At step 610 processor stores style definitions corresponding to the selected display instance in preference file. In the present illustration, processor 122 creates a preference file including a tag from an XML file and the user selected style definitions corresponding to the tag and an indication that the style definitions have been selected. For example, if a user has selected display instance 220, processor 122 stores an indication that a tag of NAME was selected, with 14 point font size and regular font style, a tag of BUSTYPE was selected with 12 point font size and italic font style, and a tag of PHONE was selected with 12 point font size and regular font style. If these particular style definitions are selected again at a later time, the indication may be incremented to track how many times the user has selected a particular tag and style definition combination. In this manner, a user's preferences for stylized digital content may be stored for later use as described below.

Specifically, the developer's preferences may be used in mapping from an area of display device 144 to a display instance as described at step 315 above. FIG. 6b is a flow diagram of a method for displaying stylized digital content based on the stored preference. At step 620 processor 122 reads a preference file, for example, the preference file stored at step 610. In particular, processor 122 reads an indication of a tag and style definition combination. The indication may include a representation of how many times a particular tag and style definition combination has been chosen.

At step 630, processor 122 maps display instances of stylized digital content to areas of display device based on the indications read from the preference file at step 620. For example, processor 122 may map the tag and style definition combination that is indicated as the most often selected to the areas at the top of display device 144. In this manner, a user may quickly preview and scroll through the most often selected combinations by scrolling the cursor device along the top of display device 144.

Those skilled in the art will recognize that advertisements, and thus content items may contain a graphical image in addition to text. To provide the most speed upon displaying an instance, the graphical image may be represented by a box where the image would normally appear in the instance, a low resolution version of the graphical image, or a smaller version of the graphical image. Also, to increase speed, a display instance may be stored in page memory, or other memory, and blitted to display memory.

Advertisements come in many sizes. A typical phone book may contain a full page advertisement or a single line advertisement. Advertisement size is another style definition that may be varied. By varying the advertisement size, display instances of different sizes are created. That is, processor 122 reads the advertisement size style definition and creates an appropriately sized display instance.

Further, some advertisements may not have all digital content items defined during the development of the advertisement. For example, a logo may still be undergoing development or a telephone number may not be selected yet. In such a case, processor 122 reads a blank field in the content file and displays a box in place of the blank digital content item.

Thus the present invention provides a system and method for rapid creation and display of stylized digital content items. A user may use a pointing device to quickly audition various permutations of display instances of stylized digital content to determine which display instances are desirable. Moreover, the user may quickly preview many display instances of stylized digital content without having to navigate through a series of drop down menus. Further, once a desirable style definition is previewed, it may be accepted and the method will no longer vary that accepted style definition. In this manner, a user may narrow down the possible combinations of style definitions and content. Further, a developer's preferences may be stored and used in displaying instances of stylized digital content such that preferred style definitions correspond to a particular area of the display device.

Executable instructions for implementing aspects of the present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing examples have been provided merely for the purpose of explanation and are in no way to be construed as limiting of the present invention. While the invention has been described with reference to illustrative embodiments, it is understood that the words which have been used herein are words of description and illustration, rather than words of limitation. Further, although the invention has been described herein with reference to particular structure, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A computer-implemented method for creating stylized digital content, the method comprising:

reading a first file containing a digital content item to be stylized;

reading a plurality of second files, each second file containing at least one first style definition and at least one second style definition, and each second file containing a different set of style definitions;

sending a prompt to a display device indicating a status of the first style definition and the second style definition;

receiving an accepted status for the first style definition and a non-accepted status for the second style definition;

selecting, from the plurality of second files, a subset of second files containing the first style definition;

creating a plurality of display instances of stylized digital content by applying the subset of second files to the content of the first file;

mapping each of the plurality of display instances of stylized digital content to a different area of a display device;

receiving a selection of a location corresponding to an area of the display device mapped to one of the plurality of display instances of the stylized content; and presenting for display the one of the plurality of display instances of stylized content corresponding to the received selection of the location.

2. The computer-implemented method of claim 1, further comprising:

receiving a selected display instance having a selected style definition; and storing an indication of the selected style definition.

3. The computer-implemented method of claim 2, further comprising:

reading the stored indication; and mapping an area of the display device to a selected one of the plurality of second files based on the indication.

4. A non-transitory computer-readable medium having instructions stored thereon for creating stylized digital content, wherein the instructions, when executed on a processor, cause the processor to perform:

reading a first file containing a digital content item to be stylized;

reading a plurality of second files, each second file containing at least one first style definition and at least one second style definition, and each second file containing a different set of style definitions;

sending a prompt to a display device indicating a status of the first style definition and the second style definition;

receiving an accepted status for the first style definition and a non-accepted status for the second style definition;

selecting, from the plurality of second files, a subset of second files containing the first style definition;

creating a plurality of display instances of stylized digital content by applying the subset of second files to the content of the first file;

mapping each of the plurality of display instances of stylized digital content to a different area of a display device;

receiving a selection of a location corresponding to an area of the display device mapped to one of the plurality of display instances of the stylized content; and presenting for display the one of the plurality of display instances of stylized content corresponding to the received selection of the location.

5. The non-transitory computer readable medium of claim 4, wherein the instructions further cause the processor to perform:

receiving a selected display instance having a selected style definition; and storing an indication of the selected style definition.

6. The non-transitory computer readable medium of claim 5, wherein the instructions further cause the processor to perform:

reading the stored indication; and mapping an area of the display device to a selected one of the plurality of second files based on the indication.

7. A device for creating stylized digital content, comprising:

a memory configured to store files and instructions; and a processor configured to execute the instructions stored in the memory, wherein the processor:

reads a first file containing a digital content item to be stylized from the memory;

reads a plurality of second files, each second file containing at least one first style definition and at least one second style definition, and each second file containing a different set of style definitions, from the memory;

sends a prompt to a display device indicating a status of the first style definition and the second style definition;

receives an accepted status for the first style definition and a non-accepted status for the second style definition;

selects, from the plurality of second files, a subset of second files containing the first style definition;

creates a plurality of display instances of stylized digital content by applying the subset of second files to the content of the first file;

maps each of the plurality of display instances of stylized digital content to a different area of the display device;

receives a selection of a location corresponding to an area of the display device mapped to one of the plurality of display instances of the stylized content; and presents for display the one of the plurality of display instances of stylized content corresponding to the received selection of the location on the display device.

8. The device of claim 7, wherein the processor further:

receives a selected display instance having a selected style definition; and stores an indication of the selected style definition in the memory.

9. The device of claim 8, wherein the processor further:

reads the stored indication from the memory; and maps an area of the display device to a selected one of the plurality of second files based on the indication.

* * * * *